United States Patent
Di Mondo

(10) Patent No.: US 12,534,589 B2
(45) Date of Patent: Jan. 27, 2026

(54) ENCAPSULATION OF MODIFIERS IN DEPOLYMERIZED PRODUCTS

(71) Applicant: GreenMantra Recycling Technologies Ltd., Brantford (CA)

(72) Inventor: Domenic Di Mondo, Brantford (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 41 days.

(21) Appl. No.: 16/840,414

(22) Filed: Apr. 5, 2020

(65) Prior Publication Data

US 2020/0231776 A1 Jul. 23, 2020

Related U.S. Application Data

(63) Continuation of application No. PCT/CA2018/051517, filed on Nov. 28, 2018.

(60) Provisional application No. 62/591,434, filed on Nov. 28, 2017.

(51) Int. Cl.
| | |
|---|---|
| *C08J 11/12* | (2006.01) |
| *C08J 3/20* | (2006.01) |
| *C08J 11/16* | (2006.01) |
| *C08K 3/04* | (2006.01) |

(52) U.S. Cl.
CPC .............. *C08J 11/12* (2013.01); *C08J 3/203* (2013.01); *C08J 11/16* (2013.01); *C08J 2323/06* (2013.01); *C08J 2325/06* (2013.01); *C08J 2391/06* (2013.01); *C08J 2421/00* (2013.01); *C08K 3/042* (2017.05)

(58) Field of Classification Search
CPC . C08J 3/12; C08J 3/203; C08J 2323/06; C08J 2325/06; C08J 2391/06; C08J 2421/00; C08J 2300/30; C08K 9/10

USPC ........................................................ 428/407
See application file for complete search history.

(56) References Cited

U.S. PATENT DOCUMENTS

| | | |
|---|---|---|
| 2,549,538 A | 4/1951 | Sparks et al. |
| 2,835,659 A | 5/1958 | Guillet |
| 3,033,256 A | 5/1962 | Schrenk |

(Continued)

FOREIGN PATENT DOCUMENTS

| | | |
|---|---|---|
| AU | 2017218908 A1 | 8/2018 |
| CA | 2098778 A1 | 12/1993 |

(Continued)

OTHER PUBLICATIONS

Takuma, "Production of Aromatic Hydrocarbons by Catalytic Degradation of Polyolefins Over H-Gallosilicate", Ind. Eng. Chem. Res., 2001, pp. 1076-1082.

(Continued)

*Primary Examiner* — Tri V Nguyen
(74) *Attorney, Agent, or Firm* — Cook Alex Ltd.

(57) ABSTRACT

A method of encapsulating modifiers in a depolymerized product is disclosed. In some embodiments the material undergoing depolymerization is one of polypropylene, polystyrene, and/or polyethylene. In some embodiments, the material is composed, at least partially, of recycled material. In some embodiments, the encapsulated modifiers are added to a formulation such as an asphalt, plastic lumber, plastic wood composite, a plastic formulation, a rubber formulation, an ink formulation, a coating formulation, and/or an adhesive formulation.

20 Claims, 2 Drawing Sheets

(56) References Cited

U.S. PATENT DOCUMENTS

| | | |
|---|---|---|
| 3,143,536 A | 8/1964 | Guzzetta et al. |
| 3,278,513 A | 10/1966 | Jahrstorfer et al. |
| 3,332,926 A | 7/1967 | Baron et al. |
| 3,345,352 A | 10/1967 | Baron et al. |
| 3,411,179 A | 11/1968 | Gregory et al. |
| 3,424,822 A | 1/1969 | Liston |
| 3,441,628 A | 4/1969 | Raetzsch et al. |
| 3,642,722 A | 2/1972 | Knowles et al. |
| 3,927,693 A | 12/1975 | Johnston |
| 3,962,092 A | 6/1976 | Newman |
| 4,053,141 A | 10/1977 | Gussefeld |
| 4,059,525 A | 11/1977 | Krasnow |
| 4,105,806 A | 8/1978 | Watt |
| 4,127,619 A | 11/1978 | Godfrey |
| 4,136,251 A | 1/1979 | Bice et al. |
| 4,177,177 A | 12/1979 | Vanderhoff et al. |
| 4,178,272 A | 12/1979 | Meyer et al. |
| 4,208,252 A | 6/1980 | Yoshida et al. |
| 4,497,921 A | 2/1985 | Chang et al. |
| 4,525,216 A | 6/1985 | Nakanishi |
| 4,620,032 A | 10/1986 | Doerr |
| 4,642,401 A | 2/1987 | Coenen et al. |
| 4,847,209 A | 7/1989 | Lewis et al. |
| 5,158,982 A | 10/1992 | Stapp |
| 5,292,862 A | 3/1994 | Miura et al. |
| 5,314,741 A | 5/1994 | Roberts et al. |
| 5,315,055 A | 5/1994 | Butcher et al. |
| 5,354,930 A | 10/1994 | Atkins et al. |
| 5,369,215 A | 11/1994 | Platz |
| 5,386,055 A | 1/1995 | Lee et al. |
| 5,481,052 A | 1/1996 | Hardman et al. |
| 5,502,263 A | 3/1996 | Ponsford et al. |
| 5,608,136 A | 3/1997 | Maezawa et al. |
| 5,656,757 A | 8/1997 | Jenczewski et al. |
| 5,672,794 A | 9/1997 | Northemann |
| 5,728,909 A | 3/1998 | Butcher, Jr. |
| 5,731,483 A | 3/1998 | Stabel et al. |
| 5,821,395 A | 10/1998 | Price et al. |
| 5,830,927 A | 11/1998 | Vanderhoff et al. |
| 5,849,964 A | 12/1998 | Holighaus et al. |
| 5,876,644 A | 3/1999 | Nichols et al. |
| 5,990,206 A | 11/1999 | Tanaka et al. |
| 6,143,940 A | 11/2000 | Miller et al. |
| 6,150,577 A | 11/2000 | Miller et al. |
| 6,172,271 B1 | 1/2001 | Horizoe et al. |
| 6,172,275 B1 | 1/2001 | Tadauchi et al. |
| 6,184,427 B1 | 2/2001 | Klepfer et al. |
| 6,211,331 B1 | 4/2001 | Craig |
| 6,268,046 B1 | 7/2001 | Miller et al. |
| 6,288,296 B1 | 9/2001 | Miller et al. |
| 6,822,126 B2 | 11/2004 | Miller et al. |
| 7,834,226 B2 | 11/2010 | Miller |
| 7,893,307 B2 | 2/2011 | Smith |
| 7,923,506 B2 | 4/2011 | Cohoon et al. |
| 7,951,239 B2 | 5/2011 | Trumbore et al. |
| 8,168,839 B2 | 5/2012 | Niu |
| 8,206,500 B1 | 6/2012 | Mathis et al. |
| 8,609,778 B1 | 12/2013 | Frost et al. |
| 8,664,458 B2 | 3/2014 | Kumar et al. |
| 8,680,167 B2 | 3/2014 | Agarwal et al. |
| 9,090,829 B1 | 7/2015 | McGrevy et al. |
| 9,200,130 B2 | 12/2015 | D'Amato et al. |
| 9,353,476 B2 | 5/2016 | Henriksson et al. |
| 9,598,610 B2 | 3/2017 | Hilsenbeck |
| 9,631,153 B2 | 4/2017 | Unger et al. |
| 9,714,385 B2 | 7/2017 | Khan et al. |
| 10,000,715 B2 | 6/2018 | Kumar et al. |
| 10,308,896 B2 | 6/2019 | Scheibel et al. |
| 10,358,603 B1 | 7/2019 | Pour |
| 10,457,602 B1 | 10/2019 | Davis |
| 10,457,886 B2 | 10/2019 | Kumar et al. |
| 10,472,487 B2 | 11/2019 | Gil et al. |
| 10,519,292 B2 | 12/2019 | Yao et al. |
| 10,597,507 B2 | 3/2020 | Di Mondo et al. |
| 10,723,858 B2 | 7/2020 | Yao et al. |
| 10,870,739 B2 | 12/2020 | Di Mondo |
| 10,907,353 B2 | 2/2021 | LaTorre et al. |
| 11,046,613 B2 | 6/2021 | Davis |
| 11,072,676 B2 | 7/2021 | Di Mondo et al. |
| 11,192,999 B2 | 12/2021 | Yao et al. |
| 11,220,586 B2 | 1/2022 | Yao et al. |
| 11,279,811 B2 | 3/2022 | Di Mondo et al. |
| 11,319,493 B2 | 5/2022 | Daggupati et al. |
| 11,499,110 B2 | 11/2022 | Celik et al. |
| 11,518,865 B2 | 12/2022 | Joshi et al. |
| 11,596,935 B2 | 3/2023 | Delferro et al. |
| 11,613,623 B2 | 3/2023 | Kanattukara et al. |
| 11,780,985 B2 | 10/2023 | Delferro et al. |
| 11,999,920 B2 | 6/2024 | Arnst et al. |
| 12,031,097 B2 | 7/2024 | Vyakaranam et al. |
| 12,152,111 B2 | 11/2024 | Dubois |
| 2003/0003554 A1 | 1/2003 | Miller et al. |
| 2003/0154885 A1 | 8/2003 | Krendlinger et al. |
| 2003/0195278 A1 | 10/2003 | Forgac et al. |
| 2003/0199718 A1 | 10/2003 | Miller |
| 2003/0215588 A1 | 11/2003 | Yeager et al. |
| 2003/0225213 A1 | 12/2003 | Maehara et al. |
| 2004/0071953 A1 | 4/2004 | Sobieski |
| 2004/0161570 A1 | 8/2004 | Zanchetta et al. |
| 2005/0148487 A1 | 7/2005 | Brownscombe et al. |
| 2005/0176866 A1 | 8/2005 | Krendlinger et al. |
| 2006/0084764 A1 | 4/2006 | Hanna et al. |
| 2006/0135713 A1 | 6/2006 | Leclerc et al. |
| 2007/0117894 A1 | 5/2007 | Bach et al. |
| 2007/0263060 A1 | 11/2007 | Laksin et al. |
| 2008/0207811 A1 | 8/2008 | Brust et al. |
| 2009/0036619 A1 | 2/2009 | Herrmann et al. |
| 2009/0110925 A1 | 4/2009 | Fukuda et al. |
| 2009/0321317 A1 | 12/2009 | Widmer et al. |
| 2010/0227954 A1 | 9/2010 | Naidoo et al. |
| 2010/0233408 A1 | 9/2010 | Zickell et al. |
| 2011/0160356 A1 | 6/2011 | Martin |
| 2011/0195256 A1 | 8/2011 | Morikawa et al. |
| 2011/0196073 A1 | 8/2011 | Fee et al. |
| 2012/0016169 A1 | 1/2012 | Kumar |
| 2012/0108863 A1 | 5/2012 | Tippet et al. |
| 2012/0136107 A1 | 5/2012 | Fu et al. |
| 2012/0165455 A1 | 6/2012 | Vitrano et al. |
| 2012/0296036 A1 | 11/2012 | Allen et al. |
| 2012/0304879 A1 | 12/2012 | Tiessen et al. |
| 2012/0310023 A1 | 12/2012 | Huang et al. |
| 2013/0123396 A1 | 5/2013 | Pochert |
| 2013/0137794 A1 | 5/2013 | Kasper et al. |
| 2013/0137796 A1 | 5/2013 | Kropp |
| 2013/0180431 A1 | 7/2013 | Myszak, Jr. et al. |
| 2013/0303810 A1 | 11/2013 | Handerek |
| 2014/0023870 A1 | 1/2014 | Takamori |
| 2014/0029901 A1 | 1/2014 | Maruyama et al. |
| 2014/0046102 A1 | 2/2014 | D'Amato et al. |
| 2014/0069297 A1 | 3/2014 | Rotz et al. |
| 2014/0107307 A1 | 4/2014 | Frost et al. |
| 2014/0134533 A1* | 5/2014 | Sacripante .......... G03G 9/09328 |
| | | 430/105 |
| 2014/0182194 A1 | 7/2014 | Unger et al. |
| 2015/0105494 A1 | 4/2015 | Naidoo et al. |
| 2015/0105496 A1 | 4/2015 | Naidoo et al. |
| 2015/0203731 A1 | 7/2015 | Herrlich et al. |
| 2015/0210611 A1 | 7/2015 | Tippet et al. |
| 2015/0247096 A1 | 9/2015 | Barger et al. |
| 2015/0322263 A1 | 11/2015 | Hilsenbeck |
| 2015/0361374 A1 | 12/2015 | Kumar et al. |
| 2016/0002508 A1 | 1/2016 | Kanderski et al. |
| 2016/0017148 A1 | 1/2016 | Ruan et al. |
| 2016/0024390 A1 | 1/2016 | Ullom |
| 2016/0040074 A1 | 2/2016 | Methling |
| 2016/0053150 A1 | 2/2016 | Croteau et al. |
| 2017/0015876 A1 | 1/2017 | Schroeyers et al. |
| 2017/0232416 A1 | 8/2017 | Gil et al. |
| 2017/0283525 A1 | 10/2017 | Li et al. |
| 2017/0290945 A1 | 10/2017 | Hanson et al. |
| 2017/0306152 A1* | 10/2017 | Shulga .................. C08K 9/10 |
| 2018/0127522 A1 | 5/2018 | Land et al. |
| 2018/0208731 A1 | 7/2018 | Vankayala |
| 2018/0312694 A1 | 11/2018 | Naidoo et al. |

(56) References Cited

U.S. PATENT DOCUMENTS

| | | | |
|---|---|---|---|
| 2018/0346683 A1* | 12/2018 | DiMondo | C08J 11/12 |
| 2018/0371325 A1 | 12/2018 | Streiff et al. | |
| 2019/0062518 A1 | 2/2019 | Jurek et al. | |
| 2019/0119191 A1 | 4/2019 | Streiff et al. | |
| 2019/0194375 A1 | 6/2019 | Di Mondo et al. | |
| 2019/0249088 A1 | 8/2019 | Pour | |
| 2019/0322834 A1 | 10/2019 | Yao et al. | |
| 2020/0172779 A1 | 6/2020 | Di Mondo | |
| 2020/0392319 A1 | 12/2020 | Di Mondo et al. | |
| 2021/0061971 A1 | 3/2021 | Delferro et al. | |
| 2021/0087113 A1 | 3/2021 | Di Mondo et al. | |
| 2021/0108154 A1 | 4/2021 | Scheibel et al. | |
| 2021/0324127 A1 | 10/2021 | Di Mondo et al. | |
| 2022/0025151 A1 | 1/2022 | Di Mondo et al. | |
| 2022/0089831 A1 | 3/2022 | Kanattukara et al. | |
| 2022/0112352 A1 | 4/2022 | Nagy et al. | |
| 2022/0177705 A1 | 6/2022 | Almey et al. | |
| 2022/0340819 A1 | 10/2022 | Gray et al. | |
| 2023/0313531 A1 | 10/2023 | Balheda et al. | |
| 2024/0093033 A1 | 3/2024 | Kanaujia et al. | |
| 2024/0327715 A1 | 10/2024 | Brita et al. | |

FOREIGN PATENT DOCUMENTS

| | | | |
|---|---|---|---|
| CA | 2162005 A1 | 5/1996 | |
| CA | 2202941 A1 | 10/1998 | |
| CA | 2805570 A1 | 1/2012 | |
| CA | 2812961 A1 | 1/2012 | |
| CA | 2822678 A1 | 2/2014 | |
| CA | 2883204 A1 | 3/2014 | |
| CA | 2898257 A1 | 7/2014 | |
| CA | 3129563 A1 | 7/2014 | |
| CA | 2885144 A1 | 3/2015 | |
| CA | 2890874 A1 | 11/2015 | |
| CA | 2822678 C | 5/2017 | |
| CA | 2981710 A1 | 4/2018 | |
| CA | 3036136 A1 | 4/2018 | |
| CH | 646717 A5 | 12/1984 | |
| CN | 1120347 A | 4/1996 | |
| CN | 1712465 A | 12/2005 | |
| CN | 101103066 A | 1/2008 | |
| CN | 01205390 A | 6/2008 | |
| CN | 01205402 A | 6/2008 | |
| CN | 101205396 A | 6/2008 | |
| CN | 101205407 A | 6/2008 | |
| CN | 101434821 B | 5/2009 | |
| CN | 101502993 A | 8/2009 | |
| CN | 101704932 A | 5/2010 | |
| CN | 101787102 A | 7/2010 | |
| CN | 101970095 A | 2/2011 | |
| CN | 102066525 A | 5/2011 | |
| CN | 102205220 A | 10/2011 | |
| CN | 102989338 A | 3/2013 | |
| CN | 103146267 A | 6/2013 | |
| CN | 103429675 A | 12/2013 | |
| CN | 103509496 A | 1/2014 | |
| CN | 104449090 A | 3/2015 | |
| CN | 103168016 A | 4/2015 | |
| CN | 104552735 A | 4/2015 | |
| CN | 104847921 A | 8/2015 | |
| CN | 104877699 A | 9/2015 | |
| CN | 104910511 A | 9/2015 | |
| CN | 105102519 A | 11/2015 | |
| CN | 105143326 A | 12/2015 | |
| CN | 105153511 A | 12/2015 | |
| CN | 105219406 A | 1/2016 | |
| CN | 105315391 A | 2/2016 | |
| CN | 106413876 A * | 2/2017 | B01D 15/3885 |
| CN | 106700975 A | 5/2017 | |
| CN | 106753057 A | 5/2017 | |
| CN | 107286277 A | 10/2017 | |
| CN | 107629565 A | 1/2018 | |
| CN | 206983219 U | 2/2018 | |
| CN | 108473808 A | 8/2018 | |
| CN | 108883551 B | 11/2018 | |
| CN | 110105474 A | 8/2019 | |
| CN | 111607171 A | 9/2020 | |
| CN | 112694552 A | 4/2021 | |
| CN | 113185626 A | 7/2021 | |
| CN | 112779045 B | 10/2021 | |
| CN | 113462175 A | 10/2021 | |
| CN | 113621189 A | 11/2021 | |
| CN | 113751051 A | 12/2021 | |
| CN | 115044219 A | 9/2022 | |
| CN | 116102742 A | 5/2023 | |
| CN | 116162287 A | 5/2023 | |
| DE | 1570194 A1 | 8/1969 | |
| DE | 3642273 A1 | 4/1987 | |
| DE | 19500425 C1 | 4/1996 | |
| DE | 69323125 T2 | 8/1999 | |
| DE | 10037229 A1 | 2/2000 | |
| DE | 10022666 A1 | 11/2001 | |
| DE | 102018214702 A1 | 9/2019 | |
| EP | 0577279 A1 | 1/1994 | |
| EP | 0717094 A1 | 6/1996 | |
| EP | 0577279 B1 | 1/1999 | |
| EP | 1707614 A1 | 10/2006 | |
| EP | 2161299 A1 | 3/2010 | |
| EP | 2283094 B1 | 10/2012 | |
| EP | 3519487 | 4/2018 | |
| EP | 3397442 A1 | 11/2018 | |
| EP | 3414295 A1 | 12/2018 | |
| EP | 3441136 A1 | 12/2020 | |
| EP | 3867312 A1 | 8/2021 | |
| EP | 4206306 A1 | 7/2023 | |
| ES | 539973 | 4/1986 | |
| GB | 569043 A | 5/1945 | |
| GB | 690623 A | 4/1953 | |
| GB | 1310260 A | 3/1973 | |
| GB | 1563440 A | 3/1980 | |
| GB | 2402397 A | 12/2004 | |
| JP | S48000661 A | 1/1973 | |
| JP | S51125412 A | 11/1976 | |
| JP | S59217777 A | 12/1984 | |
| JP | H01150857 A | 6/1989 | |
| JP | 03292305 A | 12/1991 | |
| JP | H0457887 A | 2/1992 | |
| JP | H04100807 A | 4/1992 | |
| JP | H0552849 A | 3/1993 | |
| JP | H05085964 A | 4/1993 | |
| JP | H06179877 A | 6/1994 | |
| JP | 108508520 A | 9/1996 | |
| JP | H08253601 A | 10/1996 | |
| JP | H10-501563 A | 10/1998 | |
| JP | H11302663 A | 11/1999 | |
| JP | H122000512209 A | 9/2000 | |
| JP | H132001040132 A | 2/2001 | |
| JP | H142002167466 A | 6/2002 | |
| JP | H142002224652 A | 8/2002 | |
| JP | H142002256103 A | 9/2002 | |
| JP | H152003252676 A | 9/2003 | |
| JP | H152003292594 A | 10/2003 | |
| JP | H162004131675 A | 4/2004 | |
| JP | H172005170986 A | 6/2005 | |
| JP | H172005200573 A | 7/2005 | |
| JP | H172005527672 A | 9/2005 | |
| JP | H172005298802 A | 10/2005 | |
| JP | H182006056957 A | 3/2006 | |
| JP | H182006143802 A | 6/2006 | |
| JP | 2007169531 A | 7/2007 | |
| JP | H192007169531 A | 7/2007 | |
| JP | H192007529574 A | 10/2007 | |
| JP | H202008525573 A | 7/2008 | |
| JP | H212009173874 A | 8/2009 | |
| JP | H232011126995 A | 6/2011 | |
| JP | H232011225641 A | 10/2011 | |
| JP | H252013539476 A | 10/2013 | |
| JP | H272015512965 A | 4/2015 | |
| JP | H272015512972 A | 4/2015 | |
| JP | H282016523986 A | 8/2016 | |
| JP | H292017513964 A | 6/2017 | |
| JP | H302018203877 A | 12/2018 | |
| JP | R12019508524 A | 3/2019 | |
| KR | 100680677 B1 | 2/2007 | |

(56) References Cited

FOREIGN PATENT DOCUMENTS

| | | | | |
|---|---|---|---|---|
| KR | 10-0899029 B1 | * | 5/2009 | ............ C08J 9/10 |
| KR | 100949381 B1 | | 3/2010 | |
| KR | 20110051520 A | | 5/2011 | |
| KR | 101487772 B1 | | 1/2015 | |
| RO | 131874 A2 | | 5/2017 | |
| WO | 1989000419 A1 | | 1/1989 | |
| WO | 9506684 | | 3/1995 | |
| WO | 9533790 | | 12/1995 | |
| WO | 2000027942 A1 | | 5/2000 | |
| WO | 2002090403 A1 | | 11/2002 | |
| WO | 2005092963 A1 | | 10/2005 | |
| WO | 2006071214 A1 | | 7/2006 | |
| WO | 2010023173 A1 | | 3/2010 | |
| WO | 2010081054 A1 | | 7/2010 | |
| WO | 2010099963 A1 | | 9/2010 | |
| WO | 2012007833 A2 | | 7/2011 | |
| WO | 2014110644 A1 | | 7/2014 | |
| WO | 2014161767 A2 | | 10/2014 | |
| WO | WO 2015130545 A1 | | 9/2015 | |
| WO | 2015164017 A1 | | 10/2015 | |
| WO | 2015164331 A1 | | 10/2015 | |
| WO | 2017113020 A1 | | 7/2017 | |
| WO | WO 2017136957 A1 | | 8/2017 | |
| WO | WO 2017139333 A1 | | 8/2017 | |
| WO | 2017161463 A1 | | 9/2017 | |
| WO | WO 2017167947 A1 | | 10/2017 | |
| WO | WO 2018058257 A1 | | 4/2018 | |
| WO | 2018158285 A1 | | 9/2018 | |
| WO | 2019041049 A1 | | 3/2019 | |
| WO | 2019104430 A1 | | 6/2019 | |
| WO | WO 2019195915 A1 | | 10/2019 | |
| WO | 2019227233 A1 | | 12/2019 | |
| WO | 2019227234 A1 | | 12/2019 | |
| WO | 2020118453 A1 | | 6/2020 | |
| WO | 2020198871 A1 | | 10/2020 | |
| WO | 2021035351 A1 | | 3/2021 | |
| WO | 2021048187 A1 | | 3/2021 | |
| WO | 2021113951 A1 | | 6/2021 | |
| WO | 2022015971 A1 | | 1/2022 | |
| WO | 2022167903 A1 | | 8/2022 | |
| WO | 2023059623 A1 | | 4/2023 | |
| WO | 2023088861 A1 | | 5/2023 | |
| WO | 2023121379 A1 | | 6/2023 | |
| WO | 2023141665 A1 | | 7/2023 | |

OTHER PUBLICATIONS

Sari et al. "Recycling of Polyolefin Materials", Springer Series on Polymer and Composite Materials, (2016), pp. 315-339.
Sukorez® SU-90, Kolon Industries (Year: 2016).
"GreenMantra Technologies Introduces Ceranovus Wax Modifiers for Improved Asphalt Roofing Production and Performance", Sep. 12, 2016 pp. 1-3, Retrieved from the Internet: URL:https://www.prnewswire.com/news-releases/greenmantratechnologies-introduces-ceranovus-wax-modifiers-for-improved-asphaltroofing-production-and-performance [retrieved on Nov. 18, 2021].
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"GreenMantra Technologies Introduce Ceranovus Polymer Additives at IRE", Feb. 6, 2018, Retrieved from the Internet https://www.roofingcontractor.com/articles/92693-greenmantratechnologies-introduce-ceranovus-polymer-additives-at-ire [retrieved on Nov. 18, 2021].
Notice of Acceptance dated Oct. 20, 2021 for Australian App. No. 2017218908.
European Search Report dated Oct. 20, 2021 issued in connection with European App. No. 18882986.5.
European Search Report dated Nov. 11, 2021 issued in connection with European App. No. 16880228.8.
European Search Report dated Nov. 29, 2021 issued in connection with European App. No. 19810083.6.
Office Action dated on Feb. 2, 2021 in connection with Chinese Application No. 201780018293.8.
Office Action dated on Feb. 9, 2021 in connection with Chinese Application No. 201780011193.2.
Examination Report No. 1 issued on Mar. 30, 2021 in connection with Australian application No. 2017333737.
International Search Report and Written Opinion dated Apr. 15, 2021 in connection with International Application No. PCT/CA2020/000141.
Canadian Office Action dated Apr. 20, 2021 issued in connection with Canadian App. No. 3096804.
Tordella et al., "Isomorphic Interactions of Ethylenic Polymers and Paraffin Wax", J. of Polymer Science, vol. 8, 1970, pp. 81-87.
Yu, Peroxide modified polyolefin blends Part 1: Effects on LDPE/PP blends with components with similar initial viscosities, Adv. Polymer Tech., vol. 10(3), 1990, pp. 163-172.
Handbook of Adhesives Technology & Application, Beijing Adhesive Society, Aerospace Press, 1991, pp. 735-736.
Oldshue, "Fluid Mixing Technology", Chem. Industry Press, 1991, p. 279.
Teh, A Review of polyethylene-polypropylene blend and their compatibilization, Adv. Polymer Tech., vol. 13(1), 1994, pp. 1-23.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Ding et al., Thermal and catalytic degradation of high density polyethylene and commingled post-consumer plastic waste, Fuel Processing Technology, Mar. 1997, vol. 51, Issues 1-2, pp. 47-62.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Kartalis et al., Recycling of post-used PE packaging film using the restabilization technique, Poly. Degrad. And Stab., 2000, vol. 70(2), pp. 189-197.
Luo et al., Catalytic degradation of high density polyethylene and polypropylene into liquid fuel in a power-particle fluidized bed, Polymer Degradation and Stability, online, 2000, vol. 70(1), pp. 97-102.
Predel, "Pyrolysis of mixed polyolefins in a fluidised-bed reactor and on a pyro-GCMS to yield aliphatic waxes"; Polymer Degradation and Stability, 2000, vol. 70(3), pp. 373-385.
You et al., Liquid-phase catalytic degradation of polyethylene wax over silica modified zeolite catalysts, Polymer Degradation and Stability, 2001, vol. 265(2), pp. 329-336.
Seo et al., Investigation of Catalytic degradation of HDPE by hydrocarbon group type analysis, Journal of Analytical and Applied Pyrolysis, 2003, vol. 70, Issue 2, pp. 97-102.
Lai et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.
Lai et al., Development of heterogeneous catalyst by ionically bonding macrocyclic Zr—Zr complex to montmorillonite clay for depolymerization of polypropylene, Journal of Molecular Applied Catalysis A: Chemical, 2007, vol. 265(1-2), pp. 15-24.
Rosa et al., Processing and thermal, mechanical and morphological characterization of post-consumer polyolefins/thermoplastic starch blends, J. of Mat. Sci., 2007, 42(2), pp. 551-557.
Urbaniak et al. "Waxes—Products of Thermal Degradation of Waste Plastics—Obtaining, Capabilities, and Application", Archives of Waste Management and Environmental Protection, vol. 6, 2007, pp. 71-78.
Garcia et al., Recycling extruded polystyrene by dissolution with suitable solvents, J. of Mat. Cycles and Waste Management, 2009, vol. 11(1), pp. 2-5.

(56) References Cited

OTHER PUBLICATIONS

Aboulkas, Thermal degradation behaviors of polyethylene and polypropylene. Part 1: pyroloysis kinetics and mechanisms, Energy Conversion and Management, 2010, vol. 51, pp. 1363-1369.
Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.
Xanthos, Recycling of the #5 polymer, Science, 2012, vol. 337, pp. 700-702.
European Search Report dated Apr. 4, 2011 in connection with European Patent Application No. 10172039.
Extended European Search Report dated Apr. 15, 2011 in connection with European Patent Application No. 10172039.9-2104.
International Search Report and Written Opinion dated Jan. 5, 2012 in connection with International Patent Application No. PCTIB2011001642.
International Preliminary Report on Patentability dated Aug. 1, 2012, in connection with International Application No. PCTIB2011001642.
International Search Report and Written Opinion dated Sep. 20, 2013 in connection with International Application No. PCTCA2013000041.
Office Action dated Apr. 4, 2014 in connection with Chinese Application No. 201180034887.0.
Kaitz et al., "Depolymerizable polymers:preparation, applications, and future outlook", MRS Comm., 2015, vol. 5, pp. 191-204.
"SCRA Spinout Case Study—Recycling Technologies", Sep. 2015, pp. 1-3, Retrieved from the Internet: https://warwick.ac.uk/fac/crossfac/sciencecity/casestudies/recycling-technologies/ [retrieved on Aug. 22, 2019].
Office Action dated on Jun. 16, 2015 in connection with Japanese Application No. 2013-519172.
International Preliminary Report on Patentability dated on Jul. 21, 2015 in connection with International Application PCTCA2013000041.
Office Action dated Oct. 15, 2015 in connection with Malaysian Patent Application No. 2013000128.
Office Action dated on Feb. 29, 2016 in connection with Chinese Application No. 201510126290.9.
Office Action dated on Oct. 5, 2016 in connection with Canadian Application No. 2805570.
Office Action dated on Oct. 6, 2016 in connection with Canadian Application No. 2898257.
Gergo, P. et al. "Rheological Investigation of Rubber Bitumen Containing Various Waxes as Warm Mix Additive" Studia UBB Chemia LXII, 2 Tom II, 2017 p. 247-257.
International Search Report and Written Opinion dated on Mar. 17, 2017 in connection with International PCTCA2016051555.
International Search Report and Written Opinion dated May 2, 2017 in connection with PCT/CA2017/050172.
International Search Report and Written Opinion dated Jul. 25, 2017 in connection with International Application No. PCT/CA2017/050378.
Office Action dated on Nov. 30, 2017 in connection with Indian Application No. 316/KOLNP/2013.
International Search Report & Written Opinion dated Dec. 15, 2017 in connection with International Application No. PCT/CA2017/051166.
"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on Aug. 22, 2019].
International Preliminary Report on Patentability dated Jul. 12, 2018 in connection with International Application No. PCT/CA2016/051555.
International Preliminary Report on Patentability dated Aug. 23, 2018 in connection with PCT/CA2017/050172.
Office Action dated on Jun. 3, 2021 in connection with Chinese Application No. 201780059004.9.

Office Action issued on Jul. 5, 2021 in connection with Brazilian App. No. 11 2018 016499 2.
Office Action dated Jul. 6, 2021 issued in connection with JP App. No. 2019-517089.
Office Action issued on Jul. 29, 2021 in connection with Brazilian App. No. 11 2018 068992 0.
Office Action issued on Aug. 12, 2021 in connection with Brazilian App. No. 11 2019 006300 5.
Office Action issued on Aug. 30, 2021 in connection with Mexican App. No. MX/a/2018/008117.
Examination Report No. 1 issued on Sep. 8, 2021 in connection with Australian application No. 2017218908.
European Office Action dated Oct. 5, 2021 issued in connection with European App. No. 17854306.2.
Tongkao, Practical Technology for Modification of Plastics, China Light Industry Press, Oct. 2012, pp. 44-45 and 49-50.
Notice of Acceptance dated Jan. 4, 2022, issued in connection with Australian Application No. 2017333737.
Extended European Search Report dated Feb. 16, 2022, issued in connection with European Application No. EP 19811163.5.
Examination Report dated Mar. 1, 2022, issued in connection with European Application No. 17769226.6.
International Preliminary Report on Patentability dated March 1. 2022 in connection with International Application No. PCT/CA2020/051166.
Office Action dated Mar. 1, 2022, issued in connection with Mexican Application No. MX/a/2018/008117.
Office Action dated Mar. 2, 2022, issued in connection with Chinese Application No. 201780018293.8.
Office Action dated Apr. 5, 2022, issued in connection with Japanese Application No. 2019-517089.
Office Action dated May 13, 2022, issued in connection with Brazilian Application No. BR 11 2020 004155 6.
International Preliminary Report on Patentability dated May 17. 2022 in connection with International Application No. PCT/CA2020/000141.
Extended European Search Report dated Jun. 3, 2022, issued in connection with European Application No. 19894673.3.
Office Action dated Jun. 10, 2022, issued in connection with Thai Application No. 1801005835.
Office Action dated Jun. 21, 2022, issued in connection with Chinese Application No. 201780018293.8.
Notice of Allowance dated Oct. 13, 2020 for Japanese App. No. 2018-534826.
Office Action dated Oct. 22, 2020 in connection with Chinese Application No. 201680082803.3.
Office Action dated Nov. 24, 2020 in connection with Japanese Application No. 2018-542700.
Canadian Office Action dated Nov. 25, 2020 issued in connection with Canadian App. No. 3096804.
Notice of Acceptance dated Nov. 30, 2020 for Australian App. No. 2017239181.
International Search Report and Written Opinion dated Nov. 30, 2020 in connection with International Application No. PCT/CA2020/051166.
Extended European Search Report dated Dec. 17, 2020 issued in connection with EP. App. No. 16880228.8.
International Preliminary Report on Patentability dated Oct. 4, 2018 in connection with International Application No. PCT/CA2017/050378.
International Search Report and Written Opinion dated Nov. 16, 2018 in connection with PCT/CA2018/051058.
International Search Report and Written Opinion dated Feb. 5, 2019 in connection with International application No. PCT/CA2018/051517.
International Preliminary Report on Patentability dated Apr. 11, 2019 in connection with International Application No. PCT/CA2017/051166.
Examination Report No. 1 issued on May 1, 2019 in connection with Australian application No. 2018204945.
International Search Report and Written Opinion dated Jul. 4, 2019 in connection with International Application No. PCT/CA2019/000046.

(56) References Cited

OTHER PUBLICATIONS

International Search Report and Written Opinion dated Jul. 12, 2019 in connection with International Application No. PCT/CA2019/050762.
International Search Report and Written Opinion dated Jul. 26, 2019 in connection with International Application No. PCT/CA2019/050761.
Extended European Search Report dated Aug. 23, 2019 issued in connection with EP. App. No. 16880228.8.
Extended European Search Report dated Sep. 4, 2019 issued in connection with EP App. No. 17769226.6.
Notice of Acceptance for Patent Application issued on Sep. 6, 2019 in connection with Australian App. No. 2018204945.
Extended European Search Report dated Oct. 7, 2019 issued in connection with EP. App. No. 17749885.4.
Office Action issued on Jan. 13, 2020 in connection with Brazilian App. No. 11 2013 001058 4.
Canadian Office Action dated Jan. 24, 2020 issued in connection with Canadian App. No. 2898257.
Examination Report No. 1 issued on Feb. 26, 2020 in connection with Australian App. No. 2017239181.
Office Action issued on Feb. 28, 2020 in connection with Brazilian App. No. 11 2018 013600 0.
Office Action dated Mar. 2, 2020 in connection with Chinese Application No. 201680082803.3.
International Preliminary Report on Patentability dated March 3. 2020 in connection with International Application No. PCT/CA2018/051058.
International Search Report and Written Opinion dated Mar. 19, 2020 in connection with International Application No. PCT/CA2019/051814.
Partial European Search Report dated Mar. 20, 2020 in connection with European Application No. 17854306.2.
Office Action dated Apr. 28, 2020 in connection with Canadian Application No. 2898257.
Office Action dated on May 26, 2020 in connection with Japanese Application No. 2018-534826.
International Search Report and Written Opinion dated Jun. 9, 2020 in connection with International Application No. PCT/CA2020/050439.
Office Action dated on Jun. 15, 2020 in connection with Chinese Application No. 201780011193.2.
Extended European Search Report dated Jun. 20, 2020 in connection with European Application No. 17854306.2.
Office Action dated on Jun. 30, 2020 in connection with Japanese Application No. 2018-542700.
Notice of Allowance for Patent Application issued on Jul. 1, 2020 in connection with Brazilian App. No. 11 2013 001058 4.
Extended European Search Report dated May 3, 2021 issued in connection with EP. App. No. 18851118.2.
Office Action dated Jul. 1, 2022, issued in connection with Brazilian Application No. BR 11 2018 068992 0.
Office Action dated Jul. 13, 2022, issued in connection with Brazilian Application No. BR 11 2020 010448 5.
Office Action dated Aug. 23, 2022, issued in connection with Brazilian Application No. BR 11 2020 024507 0.
Office Action dated Sep. 23, 2022, issued in connection with Brazilian Application No. BR 11 2019 006300 5.
Office Action dated Nov. 17, 2022, issued in connection with Canadian Application No. 3,013,953.
Extended European Search Report dated Nov. 21, 2022, issued in connection with European Application No. 20784475.4.
Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.
Office Action dated Oct. 24, 2022, issued in connection with Brazilian Application No. BR 11 2020 024525 9.
Examination Report dated Dec. 20, 2022, issued in connection with European Application No. 16 880 228.8.
Office Action dated Jan. 13, 2023, issued in connection with Canadian Application No. 3,129,563.
Office Action dated Feb. 6, 2023, issued in connection with Canadian Application No. 3,009,917.
Extended European Search Report dated Feb. 9, 2023, issued in connection with European Application No. 22179677.4.
Office Action dated May 23, 2023, issued in connection with Japanese Application No. 2020-566670.
Office Action dated Jul. 6, 2023, issued in connection with Chinese Application No. 201880076385.6.
Mpanza et al., "Influence of Different Waxes on the Physical Properties of Linear Low-density Polyethylene", South Africa J. of Chem., vol. 59, 2006, pp. 48-54.
Farahanchi et al., Effects of ultrahigh speed twin screw extrusion on the thermal and mechanical degradation of polystyrene, Polymer Engineering, 2016, vol. 6(7), pp. 743-751.
Extended European Search Report dated Nov. 14, 2023, issued in connection with European Application No. 20898302.3.
Office Action dated Dec. 1, 2023, issued in connection with MX/a/2019/003575.
Office Action dated Dec. 12, 2023, issued in connection with Japanese Application No. 2021-533652.
Simnofske, D. et al. "Benefits of F-T Wax Based Warm Asphalt Mixes for Short-Term Binder Aging and Pavement Durability", Jun. 1, 2016, Proceedings of 6th Eurasphalt & Europbitume Congress.
Office Action published Aug. 15, 2023, issued in connection with Brazilian Application No. BR 11 2020 024507 0.
Office Action dated Aug. 16, 2023, issued in connection with Canadian Application No. 3,013,953.
Extended European Search Report dated Aug. 24, 2023, issued in connection with European Application No. 20858584.4.
Office Action dated Sep. 4, 2023, issued in connection with Chinese Application No. 201980043504.2.
Office Action dated Sep. 13, 2023, issued in connection with Brazilian Application No. BR 11 2021 019925 0.
Office Action dated Sep. 27, 2023, issued in connection with Mexican Application No. MX/a/2018/011492.
Halley et al., "Chemorheology of Polymers—From Fundamental Principles to Reactive Processing", Cambridge University Press, 2009, pp. 1-168.
"GreenMantra Technologies Introduces Ceranovus Wax Modifiers for Improved Asphalt Roofing Production and Performance", Sep. 12, 2016 pp. 1-3, Retrieved from the Internet:https://www.prnewswire.com/news-releases/greenmantratechnologies-introduces-ceranovus-wax-modifiers-for-improved-asphaltroofing-production-and-performance [retrieved on Nov. 18, 2021].
Ferraz et al., "Polystyrene recycling processes by dissolution in ethyl acetate", Journal of Applied Polymer Science, 2018.
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing_Recycled_Plastic_as_a_Bitumen_Extender_andModifier.pdf.
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.

(56) References Cited

OTHER PUBLICATIONS

Requena et al. "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.
Office Action dated Jun. 28, 2024, issued in connection with Chinese Application No. 201980036433.3.
Office Action dated Jun. 29, 2024, issued in connection with Chinese Application No. 201980082937.9.
Office Action dated Sep. 3, 2024, issued in connection with Japanese Application No. 2020-566670.
Office Action dated Jan. 16, 2024, issued in connection with Japanese Application No. 2020-566670.
Product data sheet for Ceranovus A from Greenmantra Technologies (retrieved on Feb. 12, 2024).
Office Action dated Feb. 6, 2024, issued in connection with Canadian Application No. 3,036,136.
Examination Report dated Mar. 5, 2024, issued in connection with European Application No. 18851118.2.
Extended European Search Report dated Mar. 25, 2024, issued in connection with European Application No. 23208314.7.
Xinyuan, "Polymer Materials Processing Principle", China Textiles Press, Jul. 2000, pp. 84-85.
Lijiu, "New Roofing Materials", China Building Materials Industry Press, Oct. 2012, in pp. 30-32.
Changming, "Plastic Application Technology Manual", Mechanical Industry Press, May 2013, pp. 287-288.
Examination Report dated Jan. 22, 2025, issued in connection with European Application No. 18882986.5.
Office Action dated Mar. 6, 2025, issued in connection with Chinese Application No. 201980082937.9.
Office Action dated Oct. 1, 2024, issued in connection with Japanese Application No. 2021-533652.
Partial Search Report dated Oct. 16, 2024, issued in connection with European Application No. 24167042.1.
Examiner's Report dated Nov. 12, 2024, issued in connection with Canadian Application No. 3,074,243.
Xing, Yuqing, "Thermoplastic Plastics and Their Composites", Harbin Institute of Technology Press, Dec. 1990.
Office Action dated Dec. 11, 2024, issued in connection with Chinese Application No. 201880056636.4.
Office Action dated Dec. 13, 2024, issued in connection with Chinese Application No. 201880076385.6.
Office Action dated Jan. 7, 2025, issued in connection with Canadian Application No. 3,121,281.
Extended European Search Report dated Jan. 14, 2025, issued in connection with European Application No. 24167042.1.
Office Action dated Jan. 16, 2025, issued in connection with Mexican Application No. MX/a/2020/005399.
Office Action dated Jan. 16, 2025, issued in connection with European Application No. 23208314.7.
Office Action dated Jan. 24, 2025, issued in connection with Chinese Application No. 201980036433.3.
Office Action dated Feb. 10, 2025, issued in connection with Canadian Application No. 3,083,380.
Office Action dated Apr. 1, 2025, issued in connection with Japanese Application No. 2021-533652.
Examiner's Report dated May 6, 2025, issued in connection with Canadian Application No. 3,135,868.
Reexamination Notification dated May 16, 2025, issued in connection with Chinese Application No. 201780018293.8.
Examiner's Report dated Jun. 10, 2025, issued in connection with Canadian Application No. 3,229,291.
Examiner's Report dated Jun. 13, 2025, issued in connection with Canadian Application No. 3,101,676.
Shang et al., "Investigation of Recycled Polyethylene Wax to Lower the Viscosity of SBS Modified Asphalt." Petroleum Asphalt, vol. 24, Issue 1, Feb. 28, 2010, pp. 64-69.
Office Action issued Apr. 16, 2024, issued in connection with Mexican Application No. MX/a/2019/003575.
Office Action dated May 17, 2024, issued in connection with European Application No. 17854306.2.
Office Action dated May 20, 2024, issued in connection with Chinese Application No. 201880076385.6.
Office Action dated Jun. 13, 2024, issued in connection with Chinese Application No. 201880056636.4.
Rejection Decision dated Jun. 23, 2025, issued in connection with Chinese Application No. 201880076385.6.
Office Action dated Jun. 30, 2025, issued in connection with Chinese Application No. 201880056636.4.
Examination Report dated Jul. 18, 2025, issued in connection with European Application No. 19811163.5.
Rejection decision dated Aug. 4, 2025, issued in connection with Chinese Application No. 201980082937.9.
Office Action dated Aug. 5, 2025, issued in connection with Mexican Application No. MX/a/2020/005399.
Examiner's Report dated Sep. 4, 2025, issued in connection with Canadian Application No. 3,055,974.
Niosh, "Asphalt Fume Exposures During the Application of Hot Asphalt to Roofs", DHHS (NIOSH) Publication No. 2003-112, Jun. 2003.
Examiner's Report dated Nov. 27, 2025, issued in connection with Canadian Application No. 3,083,380.
Office Action dated Oct. 23, 2025, issued in connection with Mexican Application No. MX/a/2021/012142.
Examiner's Report dated Oct. 28, 2025, issued in connection with European Application No. 19894673.3.
Rejection decision dated Nov. 12, 2025, issued in connection with Chinese Application No. 201980036433.3.
Reexamination Review Decision dated Nov. 25, 2025, issued in connection with Chinese Application No. 201780018293.8.
Extended European Search Report dated Nov. 27, 2025, issued in connection with European Application No. 25186356.9.

\* cited by examiner

ENCAPSULATION OF MODIFIERS IN DEPOLYMERIZED PRODUCTS

CROSS-REFERENCE TO RELATED APPLICATION

This application claims priority to and is a continuation of international application No. PCT/CA2018/051517, filed on Nov. 28, 2018, entitled "Encapsulation of Modifiers in Depolymerized Products". The '517 application claimed priority benefits from U.S. provisional patent application Ser. No. 62/591,434 filed on Nov. 28, 2017 also entitled, "Encapsulation of Modifiers in Depolymerized Products". The '517 and '434 applications are hereby incorporated by reference herein in their entireties.

FIELD OF THE INVENTION

The present invention relates to methods of encapsulating modifiers, the resulting encapsulated-modifier granules, methods of utilizing the encapsulated-modifier granules with formulations, and formulations made from utilizing encapsulated-modifier granules. In some embodiments, the formulations are asphalt formulations, and/or the modifiers are asphalt modifiers. In some embodiments, the formulations are wood-plastic composites. In some embodiments, the formulations are polyethylene, polypropylene, and/or polystyrene plastic processing or compounding. In other embodiments, the formulation can be rubber compounding, such as ABS, SBS, or ABS rubber compounding.

In some embodiments, the formulations are ink and/or coatings. In some embodiments, the inks are energy curable inks. In some embodiments, the inks are UV curable inks. In some embodiments, the inks are water based. In some embodiments, the inks are solvent based.

In some embodiments, the inks/coatings can be used for inkjet, overprint, lithography, flexography, gravure, screen and/or digital printing.

In some embodiments, the formulations are adhesives. In some embodiments, the formulations are hot-melt formulations, such as hot-melt adhesives. In some embodiments, the formulations are solvents. In some embodiments, the formulations are emulsions. In some embodiments, the formulations are pressure-sensitive inks and/or coatings. In some embodiments, the formulations are UV cured inks and/or coatings. In some embodiments, the formulations are water-based formulations. In some embodiments, the formulations are epoxies.

In many instances, formulations, such as asphalt compositions, include multiple components including modifiers such as additives, fillers, rubbers, and plastics. Often, these components have limited solubility/compatibility with each other.

It can be complex and tedious to mix the components together to achieve uniformity. In many embodiments, uniform distribution can be necessary for maintaining certain desired properties of a given formulation. Encapsulation is one way to improve the distribution of a given component, such as a modifier, in a formulation. Encapsulation of one material (the core) by another material (the shell) can help contain, protect, and distribute the core material during incorporation into a formulation.

By way of example, encapsulated asphalt-modifiers are used in many industries including, but not limited to, roofing, pavement, sealing, and other industries that utilize asphalt. However, traditional encapsulation methods of encapsulating asphalt-modifiers, such as using asphalt or plastic as the shell, have many drawbacks, including but not limited to, difficulty blending and forming the material into a product that is solid and stable for bulk storage at various temperatures. When modifiers are added independently (one after the other) into a formulation they can increase both the cost and time required to manufacture the desired formulation. In addition, these modifiers often must be kept at specific concentrations to guarantee their adequate dispersion into a formulation.

The use of polymer or mineral based modifiers can also require the use of expensive equipment (such as high-shear mixers) and for powders (dust mitigation systems and more robust fire prevention) which not only adds to the manufacturing costs but can also raise safety concerns of producing the desired product. Moreover, modifiers can have negative environmental impacts.

In addition, modifiers can be incompatible for particular formulations and/or difficult/dangerous to store. For example, in many asphalt formulations various fillers and fire retardants such as, but not limited to, calcium carbonate, anti-oxidant, silica, and graphite are often stored in powder form. Adding the modifiers in a powder form to an asphalt blend can be dangerous as the powder can be flammable and/or cause respiratory issues.

What is needed is a way of encapsulating modifiers, so the modifiers can be easily stored prior to use. In addition, during use the encapsulated modifiers can be dispersed uniformly, or at least near uniformly, in the formulations. This encapsulation can also protect workers and equipment from unneeded exposure to harmful modifiers or powders.

SUMMARY OF THE INVENTION

In some embodiments, an encapsulated-modifier granule includes a shell made of a depolymerized product; and at least one first-modifier located in the shell. In some embodiments, the encapsulated-modifier granule can further include at least one second-modifier located in the shell wherein the first-modifier and the second-modifier are different types of materials. In some embodiments, the encapsulated-modifier granule is spherical. In other embodiments, the encapsulated-modifier granule is cylindrical, hexagonal, or irregularly shaped.

In some embodiments, the polymeric material that is depolymerized can be at least one of polyethylene, polypropylene, polyethylene terephthalate, ethylene-vinyl acetate, polyphenylene ether, polyvinyl chloride, polystyrene, lignin, nylon, and/or cellulose. In some embodiments, the depolymerized product is a polymer.

A method of forming an encapsulated-modifier granule can comprise depolymerizing a feedstock material to create a depolymerized product and mixing at least one modifier in with the depolymerized product to create an encapsulated-modifier granule. In some embodiments, the resulting encapsulated-modifier granule can be added to a formulation. The formulation can be, among other things, an asphalt, wood-plastic composite, ink, coating, adhesive, thermoplastic composite, and/or rubber compound.

In some embodiments, the depolymerizing process is conducted via a catalytic process. In some embodiments, the depolymerizing process utilizes a [Fe—Cu—Mo—P]/$Al_2O_3$ catalyst. In some embodiments, the depolymerizing process is conducted via thermal depolymerization. In some embodiments, the depolymerizing process is conducted via free radical initiators and/or exposure to radiation, such as ionizing radiation. In some embodiments, the radiation is produced via an electron beam. In some embodiments, the initiator is an organic peroxide. In some embodiments, the depolymerization process is conducted, at least in part, via plasma depolymerization.

In some embodiments, the feedstock is selected from polyethylene, polypropylene and/or polystyrene materials. In at least some embodiments, the feedstock is at least partially comprised of recycled material, scrap material and/or reclaimed material.

In at least some embodiments, the depolymerized product is a polymer. In some embodiments, the depolymerized product is a wax. In some embodiments, the depolymerized product is a styrenic polymer.

In some embodiments the modifier is micronized, shredded and powder tire rubber, waxes, expandable carbon nano-tubes, dispersants, secondary acrylamides, tertiary acrylamides, acrylates, ketone resins, monomers, cross-linkable monomers, functional monomers, oligomers, cross-linkable oligomers, functional oligomers, polyacrylate polymers, silicones, surfactants, acrylic monomers, methacrylic monomers, flame-retardant additives, ink additives, flow additives, release additives, sulphur inhibitors, cross-linking agents, extenders, oxidants, antioxidants, hydrocarbons, antistripping agents, defoamers, styrene-butadiene-styrene (SBS), emulsifiers, calcium carbonates, pigments (such as recycled pigments and/or virgin pigments, such as carbon black), slip agents, ethylenically unsaturated monomers, cyclic lactams, photoinitiators, dyes (such as azo, xanthene and/or azine dyes), shelf-life stabilizers, carbonates, wetting agents, flow agents, de-aerators, and/or asphalt aggregate materials (such as sand, clay, and/or other fillers).

DETAILED DESCRIPTION OF ILLUSTRATIVE EMBODIMENT(S)

Figure 1:
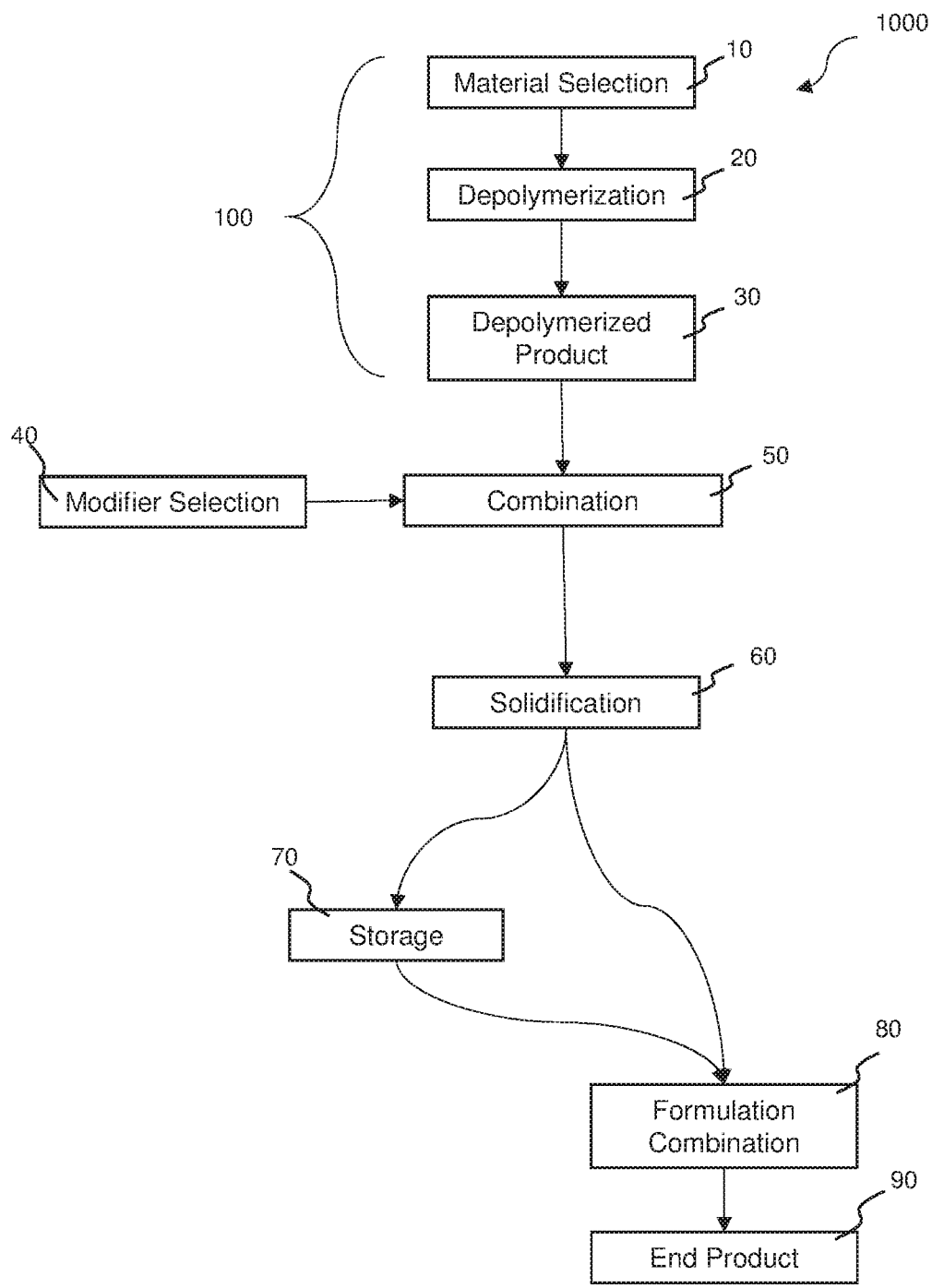
FIG. 1 is a schematic of a method of encapsulating modifiers and adding the encapsulated-modifier granules into a formulation.

Turning to FIG. 1, Method 1000 is shown for encapsulating modifiers. In some embodiments the encapsulated modifiers are added to a formulation. In some embodiments, the formulation can be an asphalt. In other embodiments, the formulation can be a wood-plastic composite. In other embodiments, the formulation can be an ink and/or coating. In other embodiments, the formulation can be an adhesive. In other embodiments, the formulation can be a thermoplastic processing. In other embodiments, the formulation can be rubber compounding, such as ABS, SBS, or ABS rubber compounding. In some embodiments, the formulation can be a polypropylene, polyethylene, and/or polystyrene plastic-based processing and/or compounding formulation.

Section 100 of method 1000 involves the depolymerization of a feedstock to create a depolymerized product. In at least some embodiments, a feedstock is chosen at Material Selection Stage 10 and is depolymerized at Depolymerization Stage 20 to create a depolymerized product at Depolymerized Product Stage 30. In some embodiments, the depolymerized product is a polymer.

In some embodiments, the feedstock can be a polymeric material. In some embodiments, the polymeric material can include polyethylene, polypropylene, and/or polystyrene material.

In some embodiments, the polymeric material can be high density polyethylene (HDPE), low density polyethylene (LDPE), linear low-density polyethylene (LLDPE), or other variations and combinations polyethylene including cross-linked polyethylene.

In some embodiments, lower levels of polystyrene, polyethylene terephthalate (PET), ethylene-vinyl acetate (EVA), (polyvinyl chloride) PVC, (ethylene vinyl alcohol) EVOH, undesirable additives and/or contaminants, such as fillers, dyes, metals, various organic and inorganic additives, moisture, food waste, dirt, or other contaminating particles can be present in the feedstock. In some embodiments, the polymeric material includes combinations of LDPE, LLDPE, HDPE, and PP.

In some embodiments, the polymeric material can be divided evenly by weight between polyethylene and polypropylene.

In some embodiments, the polymeric material comprises recycled plastics. In some embodiments, the polymeric material comprises virgin plastics. In other or the same embodiments, the polymeric material comprises recycled plastics and/or virgin plastics.

In some embodiments, the polymeric material includes waste polymeric material feed. Suitable waste polymeric material feeds include mixed polyethylene waste, mixed polypropylene waste, and a mixture including mixed polyethylene waste and mixed polypropylene waste. The mixed polyethylene waste can include LDPE, LLDPE, HDPE, PP, or a mixture including combinations of LDPE, LLDPE, HDPE and PP. In some embodiments, the mixed polyethylene waste can include film bags, milk jugs or pouches, totes, pails, caps, agricultural film, and/or packaging material. In some embodiments, the waste polymeric material feed can include up to 10% of material that is other than polymeric material, based on the total weight of the waste polymeric material feed.

In some embodiments, the polymeric material can be one of, or a combination of, virgin polyethylene (any one of, or combinations of, HDPE, LDPE, LLDPE and medium-density polyethylene (MDPE)), virgin polypropylene, recycled polyethylene terephthalate, or post-consumer, or post-industrial, polyethylene or polypropylene (exemplary sources including bags, jugs, bottles, pails, and/or other items containing PE or PP).

In certain embodiments, the feedstock material can be a polystyrene. In some embodiments, the polystyrene can be recycled. In some embodiments, the recycled polystyrene can be a pellet made from recycled polystyrene foam and/or rigid polystyrene. Suitable waste polystyrene material includes, but is not limited to, expanded, and/or extruded polystyrene foam, and/or rigid products. Virgin polystyrene can also be used. In some embodiments, the polystyrene has a low molecular weight. In some embodiments, the polystyrene is expanded polystyrene, general purpose polystyrene, high impact polystyrene and/or polystyrene foam. In some embodiments, the polystyrene is composed of acrylonitrile, butadiene and styrene.

In some embodiments, the polystyrene material can be dissolved in certain solvents to create products with various properties. In some embodiments, organic solvents, such as toluene, xylenes, cymenes, or terpinenes, are used to dissolve the polystyrene before it undergoes depolymerization within the reactor bed/vessel. In certain embodiments, the desired product can be isolated via separation or extraction and the solvent can be recycled.

In some embodiments, the polystyrene feed has an average molecular weight between an inclusive range of about 100000 amu to 500000 amu.

In some embodiments, the polyethylene feed has an average molecular weight between an inclusive range of about 100000 amu to 500000 amu.

In some embodiments, the polypropylene feed has an average molecular weight between an inclusive range of about 100000 amu to 500000 amu.

In some embodiments, the depolymerized product can be made by catalytic depolymerization of the polymeric material during Depolymerization Stage 20. In some embodiments, the depolymerized product can be made by thermally degrading the polymeric material during Depolymerization Stage 20.

In some embodiments, the depolymerizing process is conducted via free radical initiators and/or exposure to radiation, such as ionizing radiation during Depolymerization Stage 20. In some embodiments, the radiation is produced via an electron beam. In some embodiments, the initiator is an organic peroxide. In some embodiments, the depolymerization process is conducted, at least in part, via plasma depolymerization.

In some embodiments, the Depolymerization Stage 20 involves thermal, catalytic, radiation and/or initiator depolymerization.

In some embodiments the depolymerization process utilizes a catalyst such as [Fe—Cu—Mo—P]/$Al_2O_3$, Zeolite or alumina supported systems, and/or thermal depolymerization. In some embodiments, the catalyst can be contained in a permeable container.

In some embodiments, the depolymerized product can be a polymer, such as a wax, grease, oligomer, and/or styrenic polymer.

In at least some embodiments, the depolymerized product can be compatible with asphalt, plastic wood composite, asphalt modifiers, plastic wood composite modifiers, plastic formulations used in plastic compounding/processing, rubber formulations used in rubber compounding/processing, thermoplastic compounding/processing, various inks, various coatings, and/or various adhesives. In some embodiments, use of the depolymerized product as the shell reduces the rotational viscosity of the resulting formulation.

In some embodiments, the depolymerized product can be compatible with asphalt formulations used in roofing asphalts, paving asphalts, crack fillers, adhesives, and/or other products for waterproofing and joint sealing. In some embodiments, the depolymerized product can be compatible with oxidized asphalt formulations, such as coating-grade asphalt and mopping-grade asphalt, and non-oxidized asphalt, such as saturant-grade asphalt.

Due to the nature of depolymerization, the depolymerized product(s) can be created with a wide spectrum of hardness and melting points. This allows for the creation of formulation-specific depolymerized products.

In at least some embodiments, a formulation can require both a modifier and a depolymerized product. In at least some of these embodiments, an encapsulated modifier can be used to remove the need to add both the modifier and the depolymerized product as separate components of the formulation and/or in separate steps.

In at least some embodiments, the depolymerized products provide hard but not brittle encapsulation media for modifiers for storage or direct blending into formulations. Modifiers encapsulated with depolymerized products can lead to a more uniform dispersion of other modifiers in the formulation. In at least some embodiments, such as embodiments in which the formulation is an asphalt, this greater dispersion creates more stable formulations, with improved physical properties, including, but not limited to, higher softening points, harder formulations, and/or lower viscosities.

In some embodiments, when modifiers encapsulated with depolymerized product are added to an asphalt formulation, emission of volatile organic compounds can be reduced.

In some embodiments, when modifiers encapsulated with depolymerized product are added to an asphalt formulation, the performance grade of the asphalt formulation can be increased due to improved (increased) stability at higher temperatures.

In some embodiments, when modifiers encapsulated with depolymerized product are added to an asphalt formulation, the performance of the asphalt formulation is improved. Specifically, modifiers encapsulated with depolymerized product can increase resistance to flow at high temperatures, increase softening point, and/or decrease penetration of asphalt formulations.

In some embodiments, when modifiers encapsulated with depolymerized product are added to an asphalt formulation, the time required for asphalt oxidation can be reduced.

In some embodiments, when modifiers encapsulated with depolymerized product are added to ink and/or coating formulations, the modifier is more evenly dispersed within the formulation matrix.

In some embodiments, when modifiers encapsulated with depolymerized product are used in ink and/or coating formulations, the modifier is easier and/or safer to handle.

In some embodiments, when modifiers encapsulated with depolymerized product are used in ink and/or coating formulations, the modifier and/or the formulation is more stable and/or has a longer shelf-life.

In some embodiments, encapsulating modifiers with a depolymerized product protects the modifier from oxidation and/or degradation often caused by oxygen and/or heat.

In some embodiments, when modifiers encapsulated with depolymerized product are used in ink and/or coating formulations, the resulting formulation has a lower formulation viscosity which, in turn, can allow for easier processing, blending, and/or the ability to increase the modifier and/or external additive loading.

At Modifier Selection Stage 40, at least one modifier can be selected. Modifiers can be selected based on their various properties. Modifiers can include, but are not limited to, micronized, shredded and powder tire rubber, waxes, expandable carbon nano-tubes, dispersants, secondary acrylamides, tertiary acrylamides, acrylates, ketone resins, monomers, cross-linkable monomers, functional monomers, oligomers, cross-linkable oligomers, functional oligomers, polyacrylate polymers, silicones, surfactants, acrylic monomers, methacrylic monomers, flame-retardant additives, ink additives, flow additives, release additives, sulphur inhibitors, cross-linking agents, extenders, oxidants, antioxidants, hydrocarbons, antistripping agents, defoamers, styrene-butadiene-styrene (SBS), emulsifiers, calcium carbonate, pigments (such as recycled pigments and/or virgin pigments, such as carbon black), slip agents, ethylenically unsaturated monomers, cyclic lactams, photoinitiators, dyes (such as azo, xanthene and/or azine dyes), shelf-life stabilizers, carbonates, wetting agents, flow agents, de-aerators, and/or asphalt aggregate materials (such as sand, clay, and/or other fillers).

In some embodiments, the modifier can be an asphalt modifier.

In some embodiments, the modifier(s), such as the monomer(s) and/or oligomer(s), can have polar and/or polar charged groups.

In Combination Stage 50 at least one modifier and one depolymerized product are blended together in a mixing vessel. In at least some embodiments the depolymerized product can be in a liquid, semiliquid, or solid form. In at least some embodiments, the modifier(s) is/are added in the inclusive range of 0.001% to 65% wt.% of the total combined product. In some embodiments, the range can be between an inclusive range of about 0.0001% to 99.999% wt.% of the total combined product. In some preferred embodiments, the range can be between an inclusive range of about 60% to 70% wt.% of the total combined product. In some more preferred embodiments the range can be between an inclusive range of about 40% to 50% wt.% of the total combined product.

In at least some embodiments, modifiers are mixed in-line with the depolymerized product. Some advantages of using depolymerization products in-line is a decrease in cost and reduction in the amount of energy used.

In at least some embodiments involving asphalt formulations, the depolymerization product can act as a compatibilizer between the modifier, asphalt binder, and/or aggregate by lowering the surface energy in the boundary layer. This prevents, or at least reduces, agglomeration and aids in distributing the modifier particles uniformly throughout the asphalt formulation. A similar phenomenon can occur when depolymerization products are used in plastic wood composites, plastic formulations used in plastic compounding/processing, or rubber formulations used in rubber compounding/processing.

In at least some embodiments involving ink/coating formulations, the depolymerized product can be used to incorporate modifiers that can be used to modify flow, surface tension, gloss, pigment wetting and/or abrasion resistance.

In some embodiments, such as those involving ink and/or coating formulations, the depolymerized product can act as a compatibilizing agent.

In some embodiments, encapsulating a modifier in a depolymerized product before addition to the formulation can lead to improved performance than if the modifier and depolymerized product are added separately to the formulation.

In at least some embodiments, in Combination Stage 50 the mixing vessel can be heated to a temperature above the melting point of the depolymerization product(s). In some embodiments, the mixing vessel can be heated by means of electric external heaters, electric jackets, and/or steam jackets. In at least some embodiments, the depolymerization product provides consistent dispersion for the modifiers and encapsulates the modifiers.

In some embodiments, in Combination Stage 50, the semi-solid and/or solid depolymerized products can be mixed with modifiers. In some embodiments, this can be accomplished by the use of compression.

In some embodiments, the combination can be transferred into optional pelletizing equipment and/or various dimension slabs that can be grinded to a desired size at Solidification Stage 60. In at least some embodiments, the pellets are between an inclusive range of about 1 mm-30 mm in size. In some preferred embodiments, the pellets are between an inclusive range of about 1 mm to 10 mm in size.

In some embodiments, the encapsulated modifiers can be stored in Storage Stage 70 or directly mixed into various formulations at Formulation Combination Stage 80. A product can be created at End Product Stage 90. In some embodiments, the product created at End Product Stage 90 can be further modified.

In some embodiments, such as when the formulation is an asphalt, the percentage of the encapsulation product can be roughly 1% to 50% by weight of the asphalt formulation. In some preferred embodiments, the percentage of the encapsulation product can be roughly 1% to 20% by weight of the asphalt formulation. In other embodiments, where the formulation can be a plastic wood composite the percentage of the encapsulation product can be roughly 1% to 50% by weight of the plastic wood composite formulation. In some preferred embodiments, the percentage of the encapsulation product can be roughly 1% to 20% by weight of the plastic wood composite formulation. In some preferred embodiments, the percentage of the encapsulation product can be roughly 1% to 30% by weight of a plastic formulation used in plastic compounding/processing. In some preferred embodiments, the percentage of the encapsulation product can be roughly 1% to 30% by weight of a rubber formulation used in rubber compounding/processing. In other embodiments, where the formulation can be an ink formulation the percentage of the encapsulation product can be roughly 1% to 75% by weight of the ink formulation. In some preferred embodiments, the percentage of the encapsulation product can be roughly 10% to 60% by weight of the ink formulation.

In some embodiments, the encapsulation product can be compatible with asphalt formulations used in roofing asphalts, paving asphalts, crack fillers, adhesives, and/or other products for waterproofing and joint sealing. In some embodiments, the depolymerized product can be compatible with oxidized asphalt formulations, such as coating-grade asphalt and mopping-grade asphalt, and non-oxidized asphalt, such as saturant-grade asphalt.

Depolymerization products can be chosen to match specific viscosity, hardness, melting temperature, and/or dropping point ranges required for given applications. In at least some embodiments, Method 1000 allows for modifiers to be dispersed uniformly, thus eliminating, or at least reducing, the need for using modifying agents, high-shear mixers, and/or excessive energy consumption.

The above method can employ a variety of depolymerized products, including those with melt points between an inclusive range of about 90° C. to 170° C. and viscosities between an inclusive range of about 25 cps to 3000 cps. In some preferred embodiments, the depolymerized products employed have melting points between an inclusive range of about 110° C. to 130° C. and 150° C. to 170° C.

Encapsulation can allow for the reduction, if not complete elimination, of the use of powder modifiers. Powder modifiers can be dangerous, as they are often flammable and can cause respiratory issues. As a result, powder management equipment is often used when powder modifiers are added to formulations. This equipment can be expensive.

Figure 2:
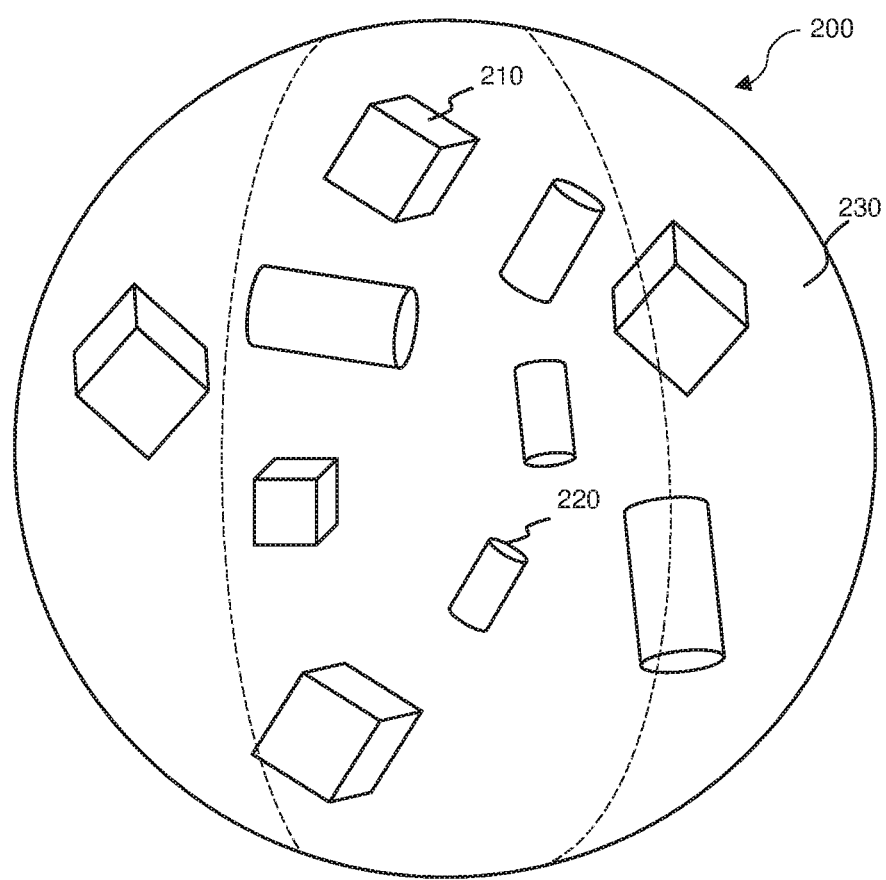
FIG. 2 is a cutaway perspective view of two types of modifiers encapsulated in a depolymerized product to create an encapsulated-modifier granule.

FIG. 2 is a cutaway perspective view of first modifier 210 and second modifier 220 encapsulated in depolymerized product 230 to create encapsulated-modifier granule 200. In some embodiments, first modifier 210 can be the same type as second modifier 220. In some embodiments, first modifier 210 and second modifier 220 are different types. In some embodiments, encapsulated-modifier granule 200 can be spherical. In some embodiments, encapsulated-modifier granule 200 can be cylindrical shaped.

Specific Example 1

In one embodiment of the above method, 500 g of micronized tire rubber with an average diameter of 30 micron was mixed with 500 g of melted wax by stirring a paddle mixer at 30 rpm at 125° C. for five minutes. The resulting product was then poured into 0.5" (1.27 cm) diameter forms and allowed to solidify. The resulting product was able to be placed in a storage container before blending it into an asphalt formulation.

Remelting experiments demonstrated that the tire rubber integrity was maintained. This demonstrated that the process prevented, or at least reduced, agglomeration of the particles and/or modification of the particles. Remelting experiments also demonstrated that the 30-micron powder could be dispersed upon melting of the depolymerized product.

Specific Example 2

In one embodiment of the above method, 500 g of carbon graphite powder was mixed with 500 g of melted wax by stirring a paddle mixer at 30 rpm at 125° C. for five minutes. The resulting product was then poured into a 0.5" (1.27 cm) diameter form and allowed to solidify. The resulting product was able to be placed in a storage container before blending it into an asphalt formulation.

Remelting experiments demonstrated that the graphite particle did not agglomerate and its integrity was maintained and that the 30-micron powder could be dispersed upon melting of the depolymerized product.

Changes in melting point, viscosity, molecular weight, and/or polymer backbone structure of the depolymerized product can change the properties of a formulation. Properties can include, but not limited to, the force ductility, thermal stability, softening point, phase separation, and/or penetration of the formulation.

Encapsulating modifiers in depolymerized products can provide the following benefits including, but not limited to:
encapsulating hard to manage powder modifiers, in a preferred easier to handle larger form;
easing the disbursement of modifiers into formulations such as hot asphalt, reducing mixing or extrusion times;
improving the dispersion of modifiers;
allowing a pathway for use of harder to blend/higher viscosity polymer and rubber modifiers;
improving the performance and/or product quality of certain formulations, such as particular asphalt and plastic wood composite formulations, plastic formulations used in plastic compounding/processing, rubber formulations used in rubber compounding/processing various ink and coating formulations, and/or various adhesive formulations;
lowering the viscosity of certain inks and/or coating formulations which in turn can allow for easier processing, blending, and/or the ability to increase the modifier and/or external additive loading;
reducing emission of volatile organic compounds in some formulations such as asphalt formulations;
improving stability of some formulations such as asphalt formulations at higher temperatures;
improving the quality of asphalt formulations by increasing the asphalt resistance to flow at high temperatures and improving the hardness properties of the asphalt such as increasing the softening point and decreasing the penetration of the asphalt formulation;
reducing the time required for asphalt oxidation; and
reducing the manufacture cost of certain formulations, such as particular asphalt and plastic wood composite formulations, plastic formulations used in plastic compounding/processing, and/or rubber formulations used in rubber compounding/processing.

While particular elements, embodiments, and applications of the present invention have been shown and described, it will be understood, that the invention is not limited thereto since modifications can be made without departing from the scope of the present disclosure, particularly in light of the foregoing teachings.

What is claimed is:

1. An encapsulated-modifier granule comprising:
    a shell made of a depolymerized wax; and
    a first-modifier located in said shell,
    wherein said depolymerized wax is formed by depolymerizing recycled polyethylene via a catalytic process.

2. The encapsulated-modifier granule of claim 1 wherein said encapsulated-modifier granule further comprises:
    a second-modifier located in said shell.

3. The encapsulated-modifier granule of claim 2 wherein said first-modifier and said second-modifier are different types of modifiers.

4. The encapsulated-modifier granule of claim 2 wherein said encapsulated-modifier granule is spherical.

5. The encapsulated-modifier granule of claim 2 wherein said encapsulated-modifier granule is cylindrical shaped.

6. The encapsulated-modifier granule of claim 2 wherein said encapsulated-modifier granule is hexagonal or irregularly shaped.

7. The encapsulated-modifier granule of claim 2 wherein said first-modifier is a pigment.

8. The encapsulated-modifier granule of claim 2 wherein said first-modifier is selected from the group consisting of micronized, shredded and powder tire rubber.

9. The encapsulated-modifier granule of claim 1 wherein said catalytic process utilizes a [Fe—Cu—Mo—P]/$Al_2O_3$ catalyst.

10. The encapsulated-modifier granule of claim 1 wherein said depolymerized wax has a melting point between an inclusive range of 110° C.-130° C.

11. An encapsulated-modifier granule comprising:
    a shell made of a depolymerized wax; and
    an at least one first-modifier located in said shell,
    wherein said depolymerized wax is formed by depolymerizing a recycled polypropylene via a catalytic process.

12. The encapsulated-modifier granule of claim 11 wherein said encapsulated-modifier granule further comprises:
    a second-modifier located in said shell.

13. The encapsulated-modifier granule of claim 11 wherein said depolymerized wax has a melting point between an inclusive range of 150° C.-170° C.

14. The encapsulated-modifier granule of claim 12 wherein said encapsulated-modifier granule is spherical.

15. The encapsulated-modifier granule of claim 12 wherein said catalytic process utilizes a [Fe—Cu—Mo—P]/$Al_2O_3$ catalyst.

16. The encapsulated-modifier granule of claim 11 wherein said first-modifier is selected from the group consisting of micronized, shredded and powder tire rubber.

17. The encapsulated-modifier granule of claim 11 wherein said first-modifier is a pigment.

18. An encapsulated-modifier granule consisting essentially of:
    a shell made of a depolymerized wax; and
    a first-modifier located in said shell,
    wherein said depolymerized wax is formed by depolymerizing a recycled polypropylene via a catalytic process.

19. The encapsulated-modifier granule of claim 18 wherein said catalytic process utilizes a [Fe—Cu—Mo—P]/$Al_2O_3$ catalyst.

20. The encapsulated-modifier granule of claim 18 wherein said depolymerized wax has a melting point between an inclusive range of 150° C.-170° C.

\* \* \* \* \*